United States Patent [19]

Abbott et al.

[11] E Patent Number: Re. 32,119

[45] Reissued Date of Patent: Apr. 22, 1986

[54] MOORING AND SUPPORTING APPARATUS AND METHODS FOR A GUYED MARINE STRUCTURE

[75] Inventors: Philip A. Abbott; James E. Dailey; Demir I. Karsan; Andrea Mangiavacchi, all of Houston, Tex.

[73] Assignee: Brown & Root, Inc., Houston, Tex.

[21] Appl. No.: 757,603

[22] Filed: Jul. 22, 1985

Related U.S. Patent Documents

Reissue of:

[64] Patent No.: 4,417,831
Issued: Nov. 29, 1983
Appl. No.: 257,391
Filed: Apr. 24, 1981

[30] Foreign Application Priority Data

Apr. 30, 1980 [GB] United Kingdom ..... 8014621

[51] Int. Cl.[4] ..... E02B 17/00

[52] U.S. Cl. ..... 405/227; 114/293; 405/224; 405/225

[58] Field of Search ..... 405/224–227, 405/195–208; 114/264, 265, 230, 294, 266

[56] References Cited

U.S. PATENT DOCUMENTS

| | | | |
|---|---|---|---|
| 776,898 | 12/1904 | Fichefet | 405/17 |
| 1,164,085 | 12/1916 | Goldsborough | 405/244 |
| 1,771,406 | 7/1930 | Fountain . | |
| 2,654,649 | 4/1972 | Richardson . | |
| 2,771,617 | 11/1956 | Brackx . | |
| 2,772,539 | 12/1956 | Sandberg | 405/202 |
| 2,881,591 | 4/1959 | Reeve | 405/224 |
| 2,919,671 | 1/1960 | Knapp et al. | 114/230 |
| 2,986,888 | 6/1961 | Borrmann et al. | 405/224 |
| 2,986,889 | 6/1961 | Ludwig | 405/224 |
| 3,082,608 | 3/1963 | Daniell | 405/224 |
| 3,087,308 | 4/1963 | Hart et al. | 405/244 X |
| 3,111,926 | 11/1963 | Shatto . | |
| 3,114,245 | 12/1963 | Jennings et al. . | |
| 3,132,627 | 5/1964 | Lesatz | 116/124 |
| 3,151,594 | 10/1964 | Collipp . | |
| 3,178,892 | 6/1965 | Stimson | 405/206 |
| 3,191,388 | 6/1965 | Ludwig . | |
| 3,279,404 | 10/1966 | Richardson . | |
| 3,422,783 | 1/1969 | Moulin | 114/144 |
| 3,423,777 | 1/1969 | Feyling . | |
| 3,434,442 | 3/1969 | Manning . | |
| 3,440,671 | 4/1969 | Smulders . | |
| 3,457,728 | 7/1969 | Pogonowski | 405/227 |

(List continued on next page.)

FOREIGN PATENT DOCUMENTS

| | | |
|---|---|---|
| 1453814 | 10/1976 | United Kingdom . |
| 1540035 | 2/1979 | United Kingdom . |

OTHER PUBLICATIONS

"Tower Designed to Ride Giant Waves", Offshore Engineering May 1978.

"The Guyed Tower as a Platform for Integrated Drilling and Production Operations", Finn et al., Journal of Petroleum Technology, Dec. 1979, pp. 1531–1537.

"Design Criteria of a Pile Founded Guyed Tower", Mangiavacchi et al., Offshore Technology Conference, May 5–8, 1980.

"Deep Water Offshore Structures: A Look at the Future" Dailey et al., presented at Mexico City in Mar. 1979.

*Primary Examiner*—Dennis L. Taylor
*Attorney, Agent, or Firm*—Lahive & Cockfield

[57] ABSTRACT

A method and apparatus for supporting a deep water guyed marine structure has a foundation which uses a system of piles connected to the marine structure only at a top portion thereof. The marine structure further has a mooring system which employs pairs of transversely, closely spaced guy lines connected to clump weights and further pairs of transversely, closely spaced guy lines connected from the clump weights to an anchor system. The marine structure mooring system can further provide a vessel mooring system in order to provide adequate control of the vessels during on and off loading of the marine structure and further to prevent fouling of the marine structure mooring system.

18 Claims, 8 Drawing Figures

U.S. PATENT DOCUMENTS

| | | | |
|---|---|---|---|
| 3,522,709 | 8/1970 | Vilain | 405/202 |
| 3,524,323 | 8/1970 | Miller | 405/202 |
| 3,602,175 | 8/1971 | Morgan et al. . | |
| 3,605,668 | 9/1971 | Morgan . | |
| 3,620,181 | 11/1971 | Naczkowski . | |
| 3,626,701 | 12/1971 | Laffont | 405/202 |
| 3,648,638 | 3/1972 | Blenkarn | 304/202 |
| 3,654,886 | 4/1972 | Silverman | 405/202 |
| 3,667,240 | 6/1972 | Vilain | 405/210 X |
| 3,670,515 | 6/1972 | Lloyd | 405/202 |
| 3,703,151 | 11/1972 | Clement . | |
| 3,710,580 | 1/1973 | Mott | 405/202 |
| 3,712,260 | 1/1973 | Mott et al. . | |
| 3,726,247 | 4/1973 | Dalzell . | |
| 3,756,033 | 9/1973 | Kouka | 405/227 |
| 3,903,705 | 9/1975 | Beck et al. | 405/224 |
| 4,000,713 | 1/1977 | Heien . | |
| 4,033,277 | 1/1977 | Schaper . | |
| 4,065,935 | 1/1978 | Burrow et al. | 405/202 |
| 4,067,282 | 1/1978 | Guinn et al. . | |
| 4,069,682 | 1/1978 | Taylor et al. | 405/202 |
| 4,100,752 | 1/1978 | Tucker . | |
| 4,109,479 | 8/1978 | Godeau et al. . | |
| 4,117,690 | 10/1978 | Besse | 405/227 |
| 4,126,010 | 11/1978 | Michel et al. | 405/202 |
| 4,137,722 | 2/1979 | Mossiossian et al. | 405/202 |
| 4,142,371 | 3/1979 | Mayfield et al. | 405/224 |
| 4,170,186 | 3/1979 | Shaw | 405/224 |
| 4,363,568 | 12/1982 | Schuh | 405/227 |
| 4,378,179 | 3/1983 | Hasle | 405/227 |
| 4,421,438 | 12/1983 | Abbott et al. | 405/227 |
| 4,422,806 | 12/1983 | Abbott et al. | 405/227 |
| 4,428,702 | 1/1984 | Abbott et al. | 405/202 |

MOORING AND SUPPORTING APPARATUS AND METHODS FOR A GUYED MARINE STRUCTURE

Matter enclosed in heavy brackets [ ] appears in the original patent but forms no part of this reissue specification; matter printed in italics indicates the additions made by reissue.

BACKGROUND OF THE INVENTION

The invention relates generally to guy line supported marine structures and in particular to guy wire supported marine structures designed to operate in water having a depth greater than about 300 feet.

Over the past thirty years, fixed jacket-type platforms have represented the most common structural solution for providing drilling and production facilities in water based structures. As the need to move into deeper waters arose, technological advancement, ever growing expertise, more sophisticated analysis techniques, and faster and larger computers pushed the state of the art further and further. Today, the tallest jacket structure stands in 1,050 feet of water in the Gulf of Mexico.

However, there are several indictions that with today's present technology, water depths beyond about 1,050 feet may require an altogether different approach. One of the main problems faced by the designer of a deep water marine structure is the dynamic interaction between waves and the structure. In shallow water, for example 300 feet, a typical jacket has a natural period of about 2 seconds; and this period is much smaller than the peak periods of the various sea states which are typical of, for example, the Gulf of Mexico. Accordingly, the ratio of the structural period of the dominant wave period (in the Gulf of Mexico) is less than one and typically this corresponds to a point on a dynamic amplification factor (DAF) curve which is to the left of the resonance peak. Thus, as long as the period ratio is small enough the dynamic amplification factor is close to one and the structural response is essentially static. However, as the water depth increases, the structural period increases and approaches the spectral peaks for the body of water; thus the dynamic amplification factor increases, becomes larger than one, and moves closer to the resonance peak. For example, for a 1000 foot jacket, the structural period is 4–6 seconds. Under this circumstance, in the Gulf of Mexico, the interaction of the jacket with a design storm is limited but the energy associated with an operating sea state is amplified significantly. As a consequence, fatigue becomes a critical aspect of the design and modification may be needed to stiffen the structure. This results in a dramatic increase in the required steel tonnage, in additional costs, and in fabrication and installation problems.

Consequently, workers in the art have turned to a different approach. Rather than trying to minimize the dynamic wave-structure interaction by reducing the structural period, the same effect was obtained by making the structural period larger than the wave period. The so-called compliant structures which resulted from this approach were the guyed tower platform, the tension leg platform, the buoyant tower, etc. A common characteristic of these structural approaches is that the ratio of the sway period to the wave period is greater than one and accordingly the dynamic amplification factor is less than one, thereby reducing dynamic loads.

With respect in particular to the guyed tower platform concept, the main areas of emphasis have been to provide sufficient compliancy to enable the structure to oscillate with the waves without over stressing the foundation. Prior art references describe for example the adaptation of the spud can as a foundation solution. In addition, the upper portion of the marine structure is guyed by using a clump weight/anchor structure configuration. This system is described in U.S. Pat. No. 3,903,705, which was issued on Sept. 9, 1975.

The structure described in U.S. Pat. No. 3,903,705, however requires significant offshore installation time, provides minimum control over clump weight spinning, and provides difficult accessibility for pipelines between the guy line structure when the number of guy lines increases (as will occur as the depth of the water increases). In addition, the spud can described in U.S. Pat. No. 3,903,705 has several disadvantages.

It is therefore an object of this invention to provide a guyed marine structure and method providing more control over the clump weight, better accessibility for pipelines between guy lines, and a significant reduction in offshore installation time for the mooring guy lines. Other objects of the invention are to provide a marine structure and method wherein the cost of the marine structure for deep water depths is less than that of a comparable jacket-type platform.

SUMMARY OF THE INVENTION

In one aspect, the invention relates to a guyed marine structure and method for improving the lateral support provided to the structure. The marine structure has a substantially upright structural member, the member extending from the bottom of a body of water to a position above the surface of the body of water. The marine structure has a lateral support assembly connected to the structural member near the water surface for providing lateral support for the member against the forces tending to move the member in a lateral direction. The structure further has a load supporting foundation connected to support at least a portion of the weight of the structural member.

The apparatus and method of the invention feature providing a first plurality of transversely spaced guy line pairs wherein each pair of lines is connected at a first end to an upper portion of the structural member and at a second end to a respective clump weight resting, unnder normal sea conditions, on the water bottom. The invention further features a second plurality of transversely spaced guy line pairs wherein each pair is connected at a first end to a respective clump weight and at a second end to a respective anchor assembly, the anchor assembly being radially spaced further from the structural member than is the associated clump weight. Thereby, under severe sea conditions wherein at least one clump weight is raised off the sea bottom, the orientation of the weight is controlled by said guy line pairs for reducing tipping or spinning; and each line of a pair of guy lines remains transversely closely spaced to the other line of the pair.

The guyed marine structure and method further feature a vessel mooring assembly and method employing a plurality of buoy members radially spaced from the structural member. First and second buoy guy lines are connected to each buoy member, and each of the first and second buoy guy lines is connected at their other ends to a different one of the anchor assemblies. Thereby, a vessel can be moored to the mooring buoy member for on and off loading of the structural member without fouling the first plurality of pairs of guy lines.

In another aspect of the invention, there is featured a chain connection assembly and method for connecting each of the guy lines of a guy line pair to the structural member. The chain connection assembly has a chain element connected to the guy line, a turning sheave secured to the structural member for first receiving an associated chain element and at least one associated chain stopper, secured to the structural member, for securing the chain in a fixed position.

In another aspect of the invention, there are featured a method and apparatus for compliantly supporting the structural member. The foundation according to the invention, features a plurality of pile members in operative relation to the structural member and having a predetermined penetration into the bottom surface of the body of water. The foundation further features an assembly for connecting the pile members to the structural member at an upper connection position near the top of the structural member whereby the pile members are free of connection to the structural member below that connecting point. Thereby the pile member axially support the weight of the upper section of the structural member and provide the necessary compliancy to the structural member.

In particular embodiments of this aspect of the invention the pile members are not grouted and the structural member has a deck portion and a tower portion. The piles are connected to the tower portion at an upper position to substantially support solely the deck portion.

This aspect of the invention further features buoyancy members for substantially neutralizing the weight of the tower portion of the structure. The buoyancy members are connected to the structural member at a position beneath the upper connection position of the piles to the structural member.

DESCRIPTION OF THE DRAWINGS

Other features, objects, and advantages of the invention will become apparent from the following description of a preferred particular embodiment of the invention taken together with the drawings in which.

DESCRIPTION OF A PREFERRED EMBODIMENT

Figure 1:
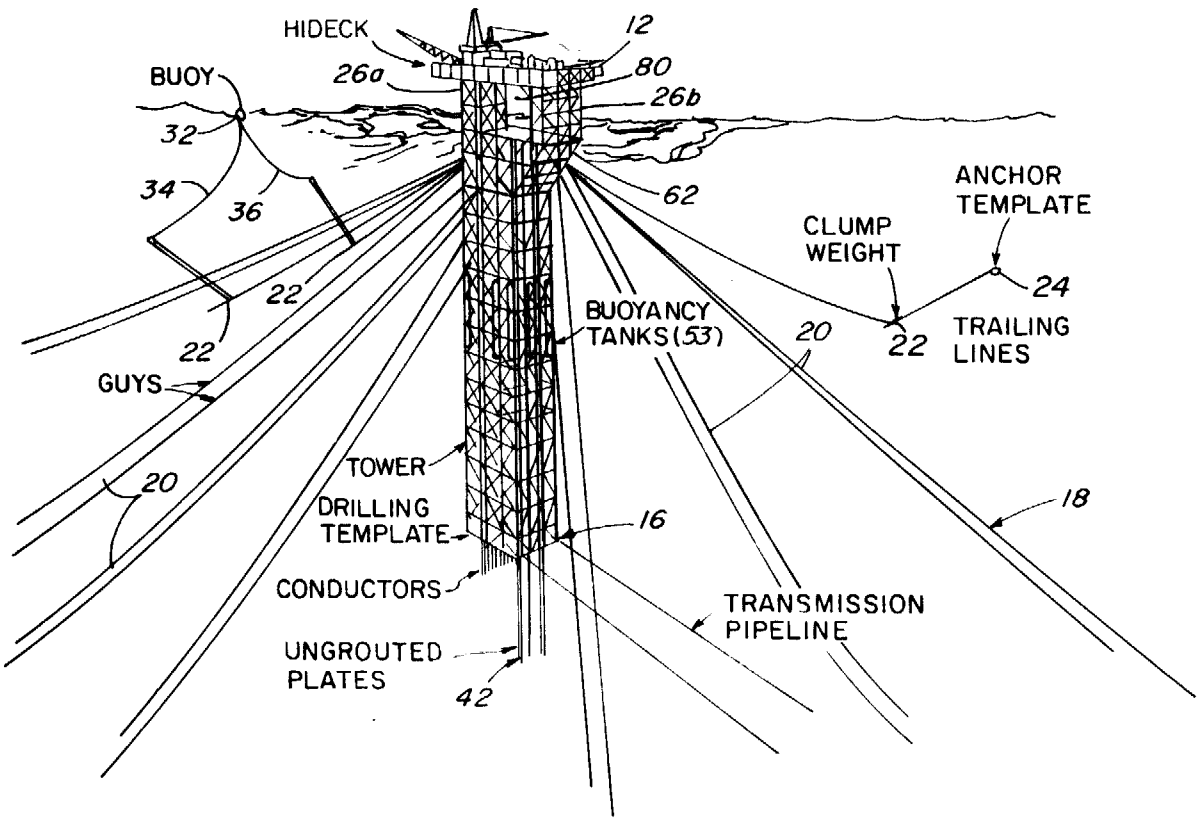
FIG. 1 is a diagrammatic somewhat perspective view of a marine structure according to the present invention.

Referring to FIG. 1, a marine structure 10, a platform used for drilling and production in deep waters, has an elevated deck 12, a tower 14, and a foundation generally indicated by 16. The marine structure is secured against lateral forces by a mooring system generally indicated by 18. The mooring system 18 has a plurality of transversely spaced guy line pairs 20a, 20b, . . . 20l. Each guy line pair is connected between an upper portion of the marine structure, and in particular an upper portion of the tower, and a respective anchoring system 24a, 24b, . . . , 24l. Between the connection to the tower and the anchoring system the paired guy lines 20 are connected to a respective clump weight 22a, 22b, . . . , 24l.

The deck 12 is preferably either a modular deck, or as illustrated in FIG. 1, an integrated deck, for example a "HIDECK". The HIDECK, which is illustrated herein, requires a relatively large space between the deck legs 26a and 26b to accommodate a barge during transportation and installation. Nevertheless, the cost savings available in terms of steel framing, derrick barge time, and especially offshore hook-up should be significant for this type of integrated deck.

As will be described in greater detail below, the lateral support for the tower is provided by the mooring system and in particular paired guy lines 20. Because of this lateral support, the tower is not expected to resist the total overturning moment caused for example by environmental conditions, as is expected of a conventional jacket. Therefore a uniform crosssection can be employed for substantially the entire height of the tower with twelve or sixteen main legs extending from the mudline to the top of the jacket. This reduces the total required steel compared to a fixed jacket with the same water depth. Furthermore, most of the members in the illustrated tower are constructed so as to be buoyant and the gravity load thereby supported by the foundation is reduced. Should the gravity load still be too heavy for the foundation, permanent buoyancy tanks 53, as described below, can be utilized to offset the excess weight.

Figure 2:
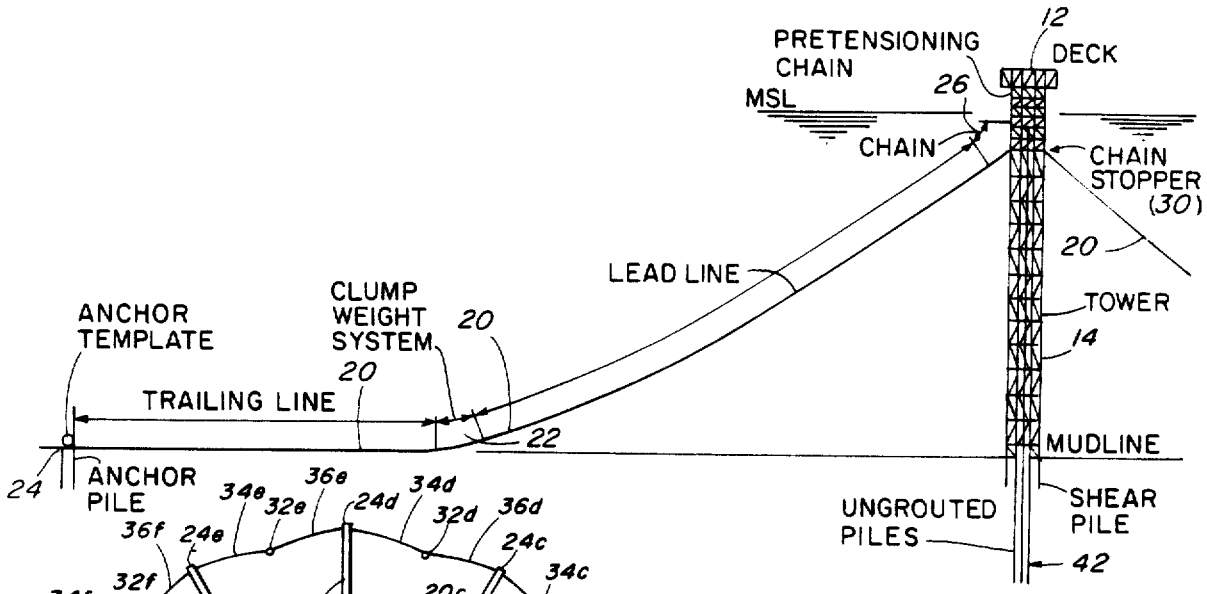
FIG. 2 is an elevation view showing the mooring system according to the present invention.
Figure 3:
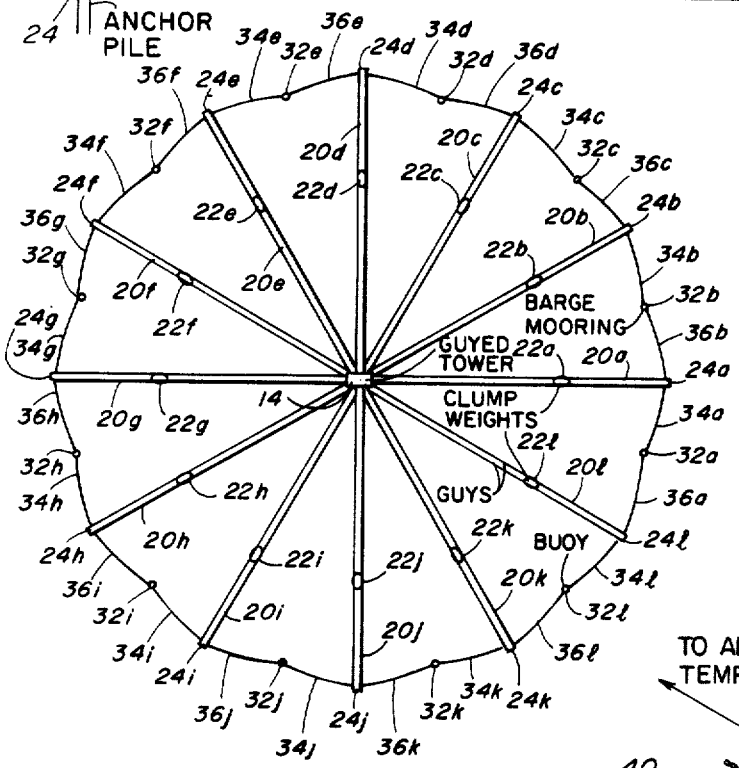
FIG. 3 is a plan view showing the mooring system according to the present invention.

Referring to FIGS. 2 and 3, the illustrated mooring system has twelve line pairs 20a, 20b, . . . , 20l, (twenty-four lines in total) extending radially fron the tower 14 at thirty degree intervals between pairs. As noted above, associated with each guy line pair 20 is an anchor assembly or template 24 and a clump weight 22. In the illustrated embodiment, the portion of the guy line pair from the tower 14 to the clump weights 22 are designated the leads lines and the portion of the guy line pairs from the clump weights 22 to the anchor assemblies 24 are designated the trailing lines. Preferably, both the lead lines and the trailing lines are made of a spiral strand. The anchor assembly in this illustrated embodiment is referably a single anchor template having four ungrouted anchor piles. By adopting paired mooring lines (for both the lead and trailing lines), there is advantageously provided a significant reduction in offshire installation time since two lines can be laid at one time, better accessibility for pipelines between the lines since the lines extend radially from the tower at twice the "old" angular interval, and better control over clump weight spinning than for example the use of a single guy lead and trailing lines connected to the clump weight.

Figure 5:
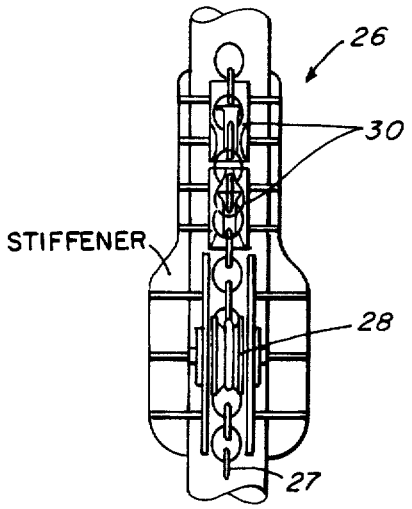
FIG. 5 is an elevation side view of the chain stopper assembly according to the invention.
Figure 6:
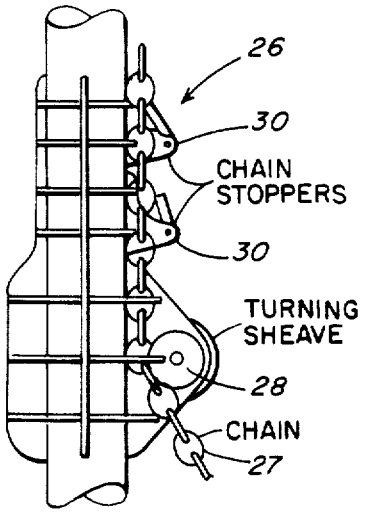
FIG. 6 is a second side view of the chain stopper assembly according to the invention.

As will be described in more detail below, the guy lines are connected to the tower using a chain assembly 26 comprising a chain 27, a turning sheave or chain fairleads 28, and chain stoppers 30 for the guy line to tower connections. (See for example FIGS. 5 and 6). This chain assembly structure eliminates strand wear in a fairlead or hawse pipe, eliminates high tension load transfer to the deck when the lead line is connected directly to the marine structure, allows small sizes of chain and chain jacks to be used for pretensioning of the mooring system, allows for positive stopping against a chain link, and allows for maintenance in the chain section without removal of the bridge strand.

As illustrated also in FIG. 3, the marine structure mooring system further has a vessel mooring system. The vessel mooring system has surface buoys 32a, 32b, . . . , 32l which are connected by surface buoy guy lines 34a, 34b, . . . and 36a, 36b, . . . respectively to respective anchor assemblies 24a, 24b, . . . Thus, a permanent mooring system is provided for use by support vessels during for example on and off loading of the deck. This structure reduces the possibility of interference between a vessel's moorings and the tower's guy mooring system.

Figure 4:
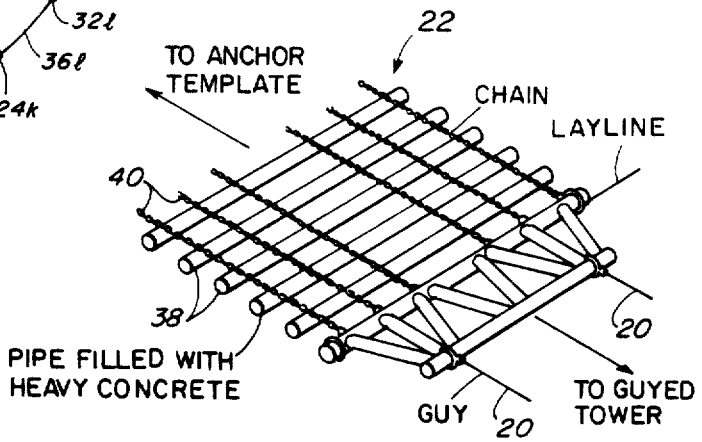
FIG. 4 is a partial perspective schematic diagram of the clump weight according to the invention.

Referring to FIG. 4, each clump weight 22 comprises a plurality of parallel pipes 38 which are interconnected by chains 40. The pipes themselves are filled with heavy concrete. Each clump weight is connected by two guy wires to both the tower (the lead lines) and to the anchor assembly (the trailing lines). Thus, when the clump weight is raised off the water bottom during periods of severe environmental conditions, the paired leading and trailing guy lines tend to prevent spinning of the clump weight which could pose an unstable condition.

Figure 7:
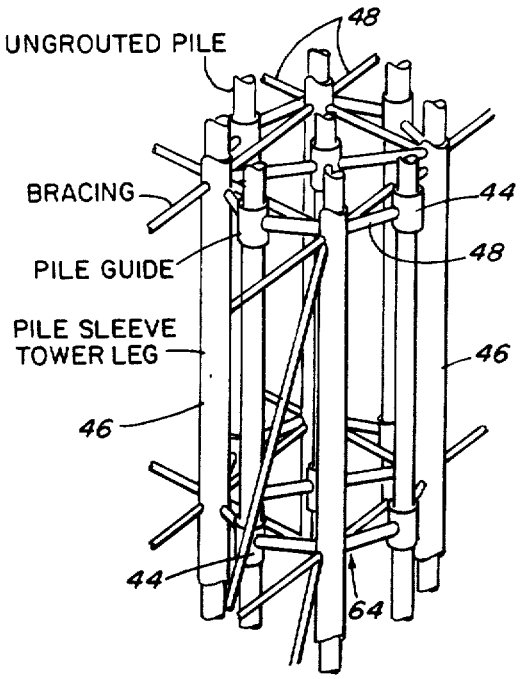
FIG. 7 is a somewhat perspective diagrammatic view of an ungrouted pile member cluster according to the invention.

Ideally, the foundation 16 of the marine structure would be a large pivot capable of supporting the gravity loads. Practically, however, in the illustrated embodiment, the foundation 16 has a plurality of ungrouted pile members 42 (FIG. 1) which are driven to a predetermined penetration into the seabed bottom. Referring to FIG. 7, in the illustrated embodiment, nine pile members are employed. Eight of the pile members are grouped in a circular configuration and the ninth pile member is positioned at the center of the circle. In the illustrated embodiment, the piles are guided by either pile guide elements 44 or the tower legs 46 which provide the function of a pile guide element by providing a pile sleeve. The pile guide element and the tower legs (pile sleeves) are interconnected using bracing elements 48. The function of these pile members is to carry vertical loads and to act as springs to provide the required lateral compliancy for the tower. In the preferred embodiment, the pile members are not connected to the tower except at a position near the uppermost part of the tower. In this manner, the pile members support substantially the entire marine structure in an axial manner from this upper location and provide the required compliancy for the marine structure. The tower is then not directly supported by the sea bed but is supported through the piles 42. The pile guide elements thus allow the pile members to slide therein.

In a deep water field development, predrilled wells may be desired to provide early production. The flexible configuration of the guyed tower marine structure illustrated in FIG. 1 offers this option by providing a drilling template 50 (FIG. 8) having for example as many as 45 predrilled wells. Another major function of the illustrated drilling template is to provide torsional restraint for torsional movement of the tower. In this respect, eight piles 52 are employed to anchor the template. The piles extend into the tower legs (as the tower is lowered into position) and resist any twisting moment due to a lack of symmetry in the structure of the loadings thereon. As will be described in further detail below, the height of the piles 52 above the drilling template can be varied in order to provide advantageous mating of the tower to the drilling template.

THEORETICAL DISCUSSION

There are several important elements in the design of the marine structure 10. The pile foundation is a very important element in the overall design. It must provide the necessary compliancy to the tower and the needed load carrying capacity while keeping the pile stresses within allowable limits. The piles are subjected mainly to axial loads due partly to the deck weight and partly to the overturning moment. The latter contribution may be particularly critical when the tower is subjected to the highest waves and undergoes large lateral deflections. Thus, the selection of the total number of piles and their locations must be made considering that the number of piles and/or the spacing increases the load carrying capacity but decreases the structural compliancy. On the other hand, the piles cannot be too closely clustered in order to avoid the potential problems deriving from group behavior. Therefore, depending upon the design specifications, each pile can be driven, if necessary, to a very deep penetration to supply the necessary axial capacity. Also, the piles can require a special design in the vicinity of the mud line and possible use of the variable wall thicknesses and high strength steel to withstand the high axial and bending stresses can be employed. To reduce the stresses and the required axial load capacity, a suitable amount of permanent buoyancy can be added in the form of buoyancy tanks 53 (FIG. 1).

Permanent buoyancy tanks 53 can be added to the marine structure 10 to help carry part of the deck weight. This buoyancy might be necessary to resist excessive loads and stresses in the piles under extreme storm conditions but may be completely unnecessary under normal operating conditions. If additional buoyancy is needed, the design of the buoyancy tanks has to take into account at least three factors. First, the loss of one tank must not be critical to operation and structural stability of the structure. Second, the tanks should be located on the tower, preferably at an interior location, at a deep enough position to avoid excessive drag forces due to waves and currents. Positioning the tanks too low however may require a very heavy wall thickness to prevent hydrostatic collapse. Third, a suitable arrangement of buoyancy tanks around the main pile cluster can contribute to the stability of the structure during towing and in the upright floating position.

In general, the design of the mooring system requires an iterative procedure which will involve several trials. There are three primary parameters considered in designing the mooring system. First, the stiffness of the mooring lines is the main stiffness in the overall system since most of the environmental load will be carried by the lines. As a consequence, the value of the structural sway period is substantially controlled by the lateral stiffness of the mooring array. The mooring system however must be designed to be fairly stiff for moderate sea states so that the structural motions will normally be small, but for high sea states the stiffness must be small enough to allow enough compliancy.

In addition, the mooring system must be designed so that line tensions under normal operating conditions do not exceed 25–30 percent of the line breaking strength. The highest loads experienced during maximum storm condition however can be around 50 percent of the line breaking strength. In the illustrated embodiment, the line tensions will be automatically limited by proper design of the clump weight and the system geometry. Therefore, as long as the tension is below is below the allowable value, the clump weight is on the seabed. As the tension increases however the clump weight lifts and the tension value in the line remains almost constant. In addition, the mooring system must be highly redundant. Thus the system must be designed so that the tower will withstand the maximum design storm with the two most critically loaded lines missing. This allows for accidental loss of a line pair or for an unexpected storm during a maintenance operation.

In the illustrated embodiment twelve line pairs are employed. Uniformly distributed clump weights are used to minimize the possibility of abrupt load excursions on the line. The line length depends mainly on the water depth while clump weight size is heavily influenced by the current and wind loadings. Depending on the environmental loads in the material used for the lines, it can happen that the stiffness requirements impose a line size number that comes very close to satisfying the redundancy and stress criteria. On occasion, a slight increase in the line size may be needed.

In the illustrated marine structure 10, most of the deck load is transmitted directly to the ungrouted piles through their connections at the top of the tower structure as described above. As a consequence, the tower's main structural function is only to keep the piles, conductors, and mooring lines connected. The stresses in the majority of the structural members are therefore generally low. While there are indications that the tower cross-sectional area can be relatively small in comparison with the fixed jacket, there are nevertheless some minimum requirements that must be met. The tower'cross section must provide sufficiently low torsional and flexural periods. A long torsional period might cause significant amplification of the torsional response under operating conditions which would induce excessive torsional rotations of the tower. A long flexural period might lead to fatigue problems. Considerations concerning installation and launch may provide additional limits to possible cost savings by reducing the required steel tonnage.

FABRICATION

Towers for water depths up to about 350 meters can be fabricated and launched in one piece from the large (190 meter) launch barges which are available today. The launch, for a long tower, however, would require very calm conditions since approximately 80 meters of the tower would overhang both the bow and the stern of the launch barge. Unless longer launch barges become available, towers for use in water depths exceeding 350 meters will probably have to be built in two sections which are launched individually and joined in the water.

The fabrication of the tower can be most economically done using the "roll-up" technique commonly employed with today's fixed jackets. The tower would be built with the straight side 60 down and the irregular side 62 up. There are four main bents to be rolled-up and the exterior bents will contain the skid legs. The two interior bents will be rolled-up first and after installing all bracings, pile sleeve clusters, and buoyancy tanks, the exterior bents will be rolled-up. Following the installation of the remaining bracing, the tower section will be prepared for skidding lengthwise onto the launch barge.

The pile cluster framing 64 illustrated in FIG. 7, can involve enough welding to justify building it in subassemblies and then lifting them into position. This could make fabrication cheaper or less expensive by doing less welding in air.

The buoyancy tanks 53, if required, can be located between the interior and exterior bents. They can be assembled in sections in a mechanical shop and later assembled into full length sections on the ground just outside the interior bents. They can be best raised, for example, by a hydraulic jacket system employing jacking towers on both sides of tanks. Two tanks can be raised using the same towers with one tank directly over the other. The towers can hold the tanks in position until they can be welded by means of braces to, for example, the pile cluster section 64 of FIG. 7.

The tower section would be end loaded onto the barge in a conventional manner by skidding it on the exterior bent skid legs. In cases where the launchable end section is fabricated in two sections, these sections can be joined either on land or on the launch barge itself. Once loaded onto the barge, appropriate tie down bracing provides sufficient fastening for the sea towing conditions anticipated.

Upon arrival at the platform site, the tower section is launched either in line or sideways to the barge center line. A sideways launch requires special tilt beams at the side of the barge and transverse skid legs in the tower. A sideways launch might prove unfeasible if the ends of the section were very different, e.g., if one end of the section had a large buoyancy tank or tanks and the other did not. If a plurality of tower sections are employed, they can best be joined or secured together in a horizontal floating condition in water. "Joining" can be done by welding although high energy connections such as the "JETLOK" technique might be employed.

In order to avoid excessive offshore installation time and exposure, it is preferable to insert the maximum possible length of pile members 42 in to the tower prior to towing it to a location site. In some cases it may be possible to insert these sections in the fabrication yard prior to loading onto the barge, although in other instances the piles may be loaded after launch. Pile sections as long as the tower can be floated horizontally and winched through the pile sleeves with the assistance, of small surface support barges.

INSTALLATION OF THE TOWER

Figure 8:
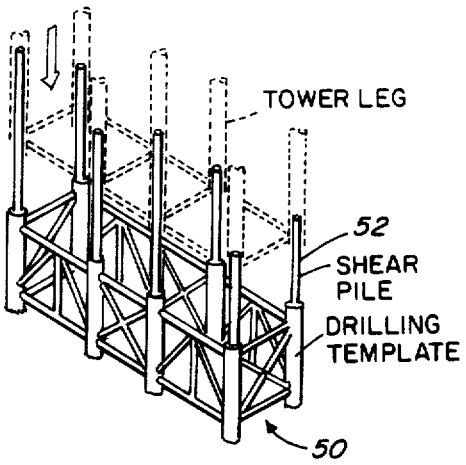
FIG. 8 is a diagrammatic perspective view of a drilling template, with shear pile members, according to the invention.

In a typical situation, the tower can be installed in two phases. The phases can be implemented one after another or, in regions of seasonally good and bad weather, during two successive "good" seasons. In the first phase of the installation, the drilling template 50 is the first item to be installed and would thereafter be the reference point for proper location of all anchor pile templates 24. The piling 52 in the template 50 would be left at progressively lower elevations, as illustrated in FIG. 8, to aid in "stabbing" the tower over them. The piling is then preferably fixed to the template either by grouting or by an internal JETLOK connection.

The guy pairs 20 would be laid beginning at the anchor template 50 end and the trailing lines would be fixed to the template prior to lowering it to the sea bed. The template would have sufficient weight so that, after it is correctly positioned, the lines can be laid before piling the template. A derrick barge can be equipped with two lowering winches which would lower the template, using the lines 34, 36 which would then later be tied off to the mooring buoys 32 as shown in FIGS. 1 and 3. Four fairleads located at the stern of the barge, two for the lowering winches and two more for handling the guys, are provided. The clump weights are handled as complete units by the derrick barge crane and are fastened to the trailing lines and the lead lines at the stern of the barge. The tower ends of the guys are left on the sea bottom with proper buoys available for pick-up during the second phase of installation.

The vessel equipped for driving piles then lowers a pile plus an underwater hammer as a unit. With the aid of acoustic positioning and underwater television, the pile would be "stabbed" into the template 24 and then driven in. It is not necessary to fix the anchor piles to the anchor pile template.

The assembled tower with the inserted pile sections is towed to the site location and launched off the stern. The tower is upended in a conventional manner by flooding the lower members and the lower sections of the buoyancy tanks attached to the tower section. The ballast control center is located on the irregular section (side 62) at the top of the tower opposite the skid legs. This section of the tower will always be well above the water level. After flooding, the tower will float upright and will have its center of buoyancy well above its center of gravity.

After upending, the auxilliary buoyancy tanks attached to the tower will be removed. The tower will first be secured to the derrick barge in a location away from the drilling template 50. The derrick barge will be secured to the buoys 32 which are fastened to the permanent anchor pile templates 24 and the tower will be secured to the barge by means of winches with one or more tugs pulling away at opposite sides of the tower. Once secured, the tower will be located over the template by adjusting the anchor winches on the derrick barge. The base of the tower is not level but has a notch on the side over the joined template so that the tower can move horizontally over the template 50 without being raised.

The tower is then set over the template piles 52 by ballasting, using the derrick barge crane as a safety backup. Once engagement is made with the highest of piles 52, a rotational adjustment is made using the securing winches to engage the second highest pile. The tower is then lowered the rest of the way down until small mud flats as the base of the tower and opposite the drilling template rest lightly on the mud line.

A temporary work deck (not shown) is set during tower construction in the slot intended for the HIDECK barge and is at the mating elevation between the deck legs and the tower legs. Piling add-on welds are made from this work deck and piling 42 can be driven with a large hammer located above the water in the usual manner. Once all of the piles 42 are driven, they will be fixed to the pile sleeves either by shim plate welds or by means of the JETLOK connection. If welds are made, they will be made "in the dry" by pumping out extensions of the pile sleeves which extend above the water surface and support the temporary work deck. As noted above, this is the only connection of pile members 42 to the tower.

The guy lines will be attached in pairs while the pile driving is in progress. The lead lines will be picked up off the bottom and placed on the deck of a dynamically positionable semi-submersible. The chain ends 27 (FIGS. 2 and 6) are attached to the lead lines and to pilot lines prerigged through the tower. A derrick barge crane will pull upward on the pilot lines and draw first the pretensioning chain and then the larger diameter chain into the chain fairleads 28 and chain stoppers 30. Once opposing guy pairs are in position they will be pretensioned by means of chain jacks temporarily located at the deck/tower meeting elevation.

After all the piles are fixed to the tower sleeves and all guys are properly pretensioned, the temporary work deck is removed and the HIDECK barge arrives on site. The barge enters the slot 8 and is moored to the permanent buoys 32. The barge is then ballasted until the deck rests on the tower, at which time the barge will exit the slot. (See for example U.S. Pat. No. 4,242,011). The chain jacks are then relocated on the bottom deck level, butt welds are made at the deck leg ends and final hookup and commissioning will commence.

MAJOR ADVANTAGES OF THE INVENTION

The marine structure and method according to the invention thus advantageously provides a pile foundation instead of spud can foundation. The pile foundation is connected to the marine structure only at a top portion thereof and better supports the upper structure while providing good compliancy.

Furthermore, the tower mooring system advantageously employs paired guys instead of single guys which provide increased reliability by maintaining more control over clump weight spinning, and which provide better accessibility for pipeline between the guy lines. In addition significant reduction in offshore installation time can be achieved. The present illustrated structure further provides a permanent set of mooring buoys for work vessels servicing the marine structure. This advantageously enables the tower mooring system to provide permanent and useful vessel mooring while minimizing the opportunity of the vessels to interfere with the mooring lines associated with the tower.

Additions, subtractions, deletions, and other modifications of the disclosed preferred embodiment of the invention will be obvious to those skilled in the art and are within the scope of the following claims.

We claim:

1. In a guyed marine structure having a substantially upright structural member, said member extending from the bottom of a body of water to a position above the surface of said body of water, a lateral support means connected to said member near said water surface for providing lateral support for said member against forces tending to move the member in a lateral direction, and a load supporting foundation connected to support at least a portion of the weight of said member, the improvement wherein said lateral support means comprises a first plurality of transversely spaced guy line pairs, each pair of lines being connected at a first end to an upper portion of said structural member and at a second end to a respective clump weight resting, under normal sea conditions, on said water bottom, and a second plurality of transversely spaced guy line pairs, each pair of lines being connected at a first end to a respective clump weight and at a second end to a respective anchor means radially spaced further from said member than said associated clump weight, whereby under severe sea conditions wherein at least a said clump weight is raised off said sea bottom said weight is raised without tipping over and each line of a said pair of guy lines remains transversely spaced from one another.

2. In a [guyed] marine structure having a substantially upright structural member, said member extending from the bottom of a body of water to a position above the surface of said body of water,

[a lateral support means connected to said member near said water surface for providing lateral support for said member against forces tending to move the member in a lateral direction,] and a load supporting foundation connected to support at least a portion of the weight of said member, the improvement wherein said load supporting foundation comprises a plurality of pile members in operative relation to said structural member having a predetermined penetration into the bottom surface of said body of water, means for connecting said pile members to said structural member at an upper connection position near the top of said structural member, said pile members being free of connection to said structural member below said connecting means, whereby said pile members support axially the weight of said upper section of said structural member and provide the necessary compliancy to said structural member.

3. The marine structure of claim 2 wherein said improvement further comprises buoyancy means connected to said structural member at a position below said upper connection position.

4. The marine structure of claims 2 or 3 further comprising means for locating said pile members in a clustered transverse configuration and wherein said piles are ungrouted.

5. The marine structure of claim 2 wherein said improvement further comprises *a lateral support means connected to said member near said water surface for providing lateral support for said member against forces tending to move the member in a lateral direction,* said lateral support means having a first plurality of transversely spaced guy line pairs, each pair of lines being connected at a first end to an upper section of said structural member and at a second end to a respective clump weight resting, under normal sea conditions, on said water bottom, and a second plurality of transversely spaced guy line pairs, each pair of lines being connected at a first end to a respective clump weight and at a second end to a respective anchor means radially spaced further from said member than said associated clump weight, whereby under severe sea conditions wherein at least a said clump weight is raised off said sea bottom said weight is raised without tipping over and each line of a said guy line pair remains transversely spaced from one another.

6. The guyed marine structure of claims 1 or 5 wherein said improvement further comprises a vessel mooring means having a plurality of buoy members radially spaced from said structural member, a first and a second buoy guy line connected to each buoy member, each said first and second buoy guy line connected at their respective other end to a different one of said anchor means, whereby a vessel can be moored to said mooring buoy means for on loading or off loading of said structural member without fouling said first plurality of guy line pairs.

7. The guyed marine structure of claims 1 or 5 wherein said structural member comprises an upper above surface deck member, a lower tower member extending from said foundation to said deck member, and said first guy line pairs are connected to an upper, below water surface portion of said tower member.

8. The guyed marine structure of claim 1 wherein the improvement further comprises a respective chain connecting means for connecting each said guy line of a guy line pair to said structural member.

9. The guyed marine structure of claim 8 wherein each said chain connecting means comprises a chain element connected to each guy line, a turning sheave secured to said structural member for first receiving a said associated chain element, and at least one associated chain stopper secured to said structural member for securing said chain in a fixed position.

10. The marine structure of claims 2 or 5 further comprising a drilling template, and a plurality of template pile members securing said template to the seabed, said template piles having a selected pile member which extends vertically upward beyond the upward extent of the other template piles for aiding in the installation of said marine structure.

11. The marine structure of claims 2 or 5 further comprising pile guide means for providing a sliding guiding support for said pile members.

12. A method for mooring a marine structure having a substantially upright structural member, said member extending from the floor of a body of water to a position above the surface of the body of water, a lateral support means connected to said member near said water surface for providing lateral support for said member against forces tending to move the member in a lateral direction, and a load supporting foundation connected to support at least a portion of the weight of said member, the method comprising the steps of providing a first plurality of transversely spaced guy line pairs, connecting each pair of transversely spaced lines at a first end to an upper portion of the structural member and at a second end to a respective clump weight resting, under normal sea conditions, on the water bottom, providing a second plurality of paired, transversely spaced guy lines, connecting each pair of said second line pairs at a first end to a respective clump weight and at a second end to a respective anchoring means radially spaced further from said member than said associated clump weight, whereby under severe sea conditions wherein a said clump weight is raised off said sea bottom said weight is raised without tipping over and each line of a guy line pair remains transversely spaced from the other line of the pair.

13. A method for mooring a marine structure having a substantially upright structural member, said member extending from the floor of a body of water to a position above the surface of the body of water, a lateral support means connected to said member near said water surface for providing lateral support for said member against forces tending to move the member in a lateral direction, and a load supporting foundation connected to support at least a portion of the weight of said member, the method comprising the steps of providing a first plurality of paired, transversely spaced guy lines, connecting each pair of transversely spaced lines at a first end to an upper portion of the structural member and at a second end to a respective clump weight resting, under normal sea conditions, on the water bottom, providing a second plurality of paired, transversely spaced, guy lines, connecting each pair of said second line pairs at a first end to a respective clump weight and at a second end to a respective anchoring means radially spaced further from said member than said associated clump weight, providing a plurality of buoy members radially spaced from said structural member, connecting a first and a second buoy guy line to each buoy member, and connecting each said first and second buoy guy lines at their respective other ends to a different one of said anchor means, whereby said buoy members provide a mooring structure for vessels approaching said marine structure.

14. The method of claim 12 or claim 13 further comprising the step of connecting each said guy line of said first pairs of guy lines to said structural members using a chain connecting assembly, whereby wear on the guy line is reduced.

15. A method of compliantly supporting a marine structure, said structure having a substantially upright structural member, said member extending from the bottom of a body of water to a position above the surface of said body of water,

[a lateral support means connected to said member near said water surface for providing lateral support for said member against forces tending to move the member in a lateral direction,] and a load supporting foundation connected to support at least a portion of the weight of said member, the method comprising the steps of positioning a plurality of pile members at predetermined penetration distance into the bottom surface of said body of water and in operative relation to said structural member, connecting said pile members to said structural member at an upper connection position near the top of said structural member whereby said pile members are free of connection to said structural member below said connection point, whereby said pile members support axially the weight of said upper section of said structural member and provide the necessary compliancy to said structural member.

16. The method of claim 15 further comprising the step of buoyantly supporting the lower portion of said structural member at positions below said upper connection position or point.

17. A method for compliantly supporting a marine structure having a substantially upright structural member, said member extending from the bottom of a body of water to a position before the surface of the body of water, a lateral support means connected to a member near said water surface for providing lateral support for said member against forces tending to move the member in a lateral direction, and a load supporting foundation connected to support at least a portion of the weight of said member, the method comprising the steps of providing a first plurality of transversely spaced guy line pairs, connecting each pair of lines at a first end to an upper portion of said structural member and at a second end to a clump weight, resting, under normal sea conditions, on said surface bottom, providing a second plurality of transversely spaced guy line pairs, connecting each pair of said second lines at a first end to a said respective clump weight and at a second end to a respective anchor means radially spaced further from said member than said associated clump weight, positioning a plurality of pile members in an operative relation to said structural member and at a predetermined penetration into the bottom of said body of water, connecting said pile members to said structural member at an upper connection position near the top of said structural member, and maintaining said pile members free from connection to said structural member below said connection position, whereby said pile members axially support the weight of said upper section of said structural member and provide necessary compliancy of said structural member and whereby under severe sea conditions wherein at least a said clump weight is raised off said sea bottom, said clump weight is raised without tipping over and each line of a guy line pair remain transversely spaced from one another.

18. The method of claim 17 further comprising the steps of spacing a plurality of buoy members radially from said structural member and at positions between respective anchor means, connecting a first and second buoy guy line to each buoy member, connecting other ends of said first and second buoy guy lines at two different spaced apart but adjacent ones of said anchor means, whereby a vessel can be moored to said buoy members for on and off loading of said structural member without fouling said first plurality of guy line pairs.

* * * * *